March 5, 1963  V. E. RIMSHA  3,079,950
FLUID MIXING VALVE
Filed April 15, 1954
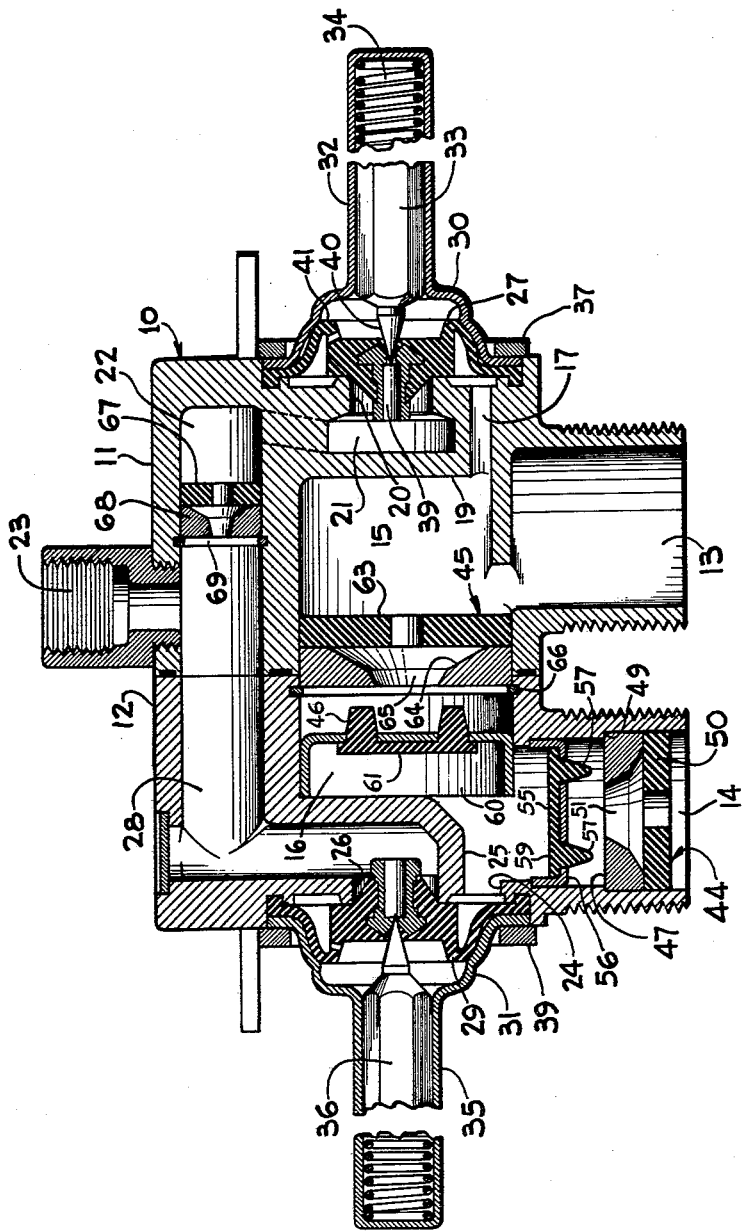
INVENTOR
VICTOR E. RIMSHA
BY
*Hill Sherman Meroni Gross & Simpson*
ATTORNEYS 3,079,950
FLUID MIXING VALVE
Victor E. Rimsha, Chicago, Ill., assignor to The Dole Valve Company, Chicago, Ill., a corporation of Illinois
Filed Apr. 15, 1954, Ser. No. 423,293
2 Claims. (Cl. 137—606)

This invention relates to improvements in fluid mixing valves of the type adapted to deliver either hot water or a mixture of hot and cold water at an intermediate constant temperature.

My invention has as one of its principal objects to provide a new and improved fluid mixing valve compensating for pressure variations of the hot and cold water and maintaining a constant proportioning of the water in a simpler manner than formerly.

Another object of my invention is to provide a simpler form of mixing valve than formerly, in which the proportioning of the mixed hot and cold water is maintained constant by the use of uniform delivery flow control or proportioning devices taking the place of the thermostatic element heretofore used in such valves.

A further object of my invention is to provide a novel and improved form of mixing valve delivering an accurate and constant proportion of hot and cold water regardless of pressure variations of the hot and cold water at the inlets to the valve.

Still another object of my invention is to provide a non-thermostatically controlled fluid mixing valve so arranged as to prevent a predominance of either hot or cold water, occasioned by pressure variations in the hot or cold water lines, by the use of a flow proportioning device in the cold water inlet into the valve body, and a similar flow proportioning device in the hot water inlet into the mixing chamber.

A further object of my invention is to provide a simplified and improved form of mixing valve having selectively operable hot and mixed water shut off valves and a central mixing chamber, with pressure responsive flow control devices in the hot and cold water inlets into the mixing chamber.

These and other objects of my invention will appear from time to time as the following specification proceeds and with reference to the accompanying drawing wherein:

The FIGURE is a transverse sectional view taken through a valve constructed in accordance with my invention with the solenoid coils for controlling the passage of mixed and hot water from the valve body removed, and showing parts of the valve plungers and guides therefor broken away.

In the embodiment of my invention, illustrated in the drawing, the valve is shown as comprising a valve body 10 made up of two hollow body parts 11 and 12, connected together in aligned relation with respect to each other. It should here be understood, that the showing of my invention in the drawing is illustrative only, and that the valve body need not be in two parts but may be in one part if desired.

The body part 11 is shown as having a hot water inlet 13 leading thereinto. The body part 12 is shown as having a cold water inlet 14 leading thereinto. The valve body parts 11 and 12 may be cast or molded from brass, bronze or a nylon plastic, or may be extruded from a brass bar or a nylon plastic into the general valve body shape desired, and may then be drilled and machined as required.

The body part 11 is shown as having a hot water chamber 15 therein, in direct alignment with a mixing chamber 16 in the body part 12, and having communication with the cold water inlet 14 and forming a mixing chamber for the hot and cold water.

The hot water inlet 13 and hot water chamber 15 are shown as communicating with a hot water passageway 17, leading through an end wall 19 of the valve body and opening to the end thereof. The wall 19 of the valve body is shown as having a passageway 20 leading thereinto from the end thereof, in axial alignment with the center of the chamber 15 and communicating with a hot water bypass passageway 21, leading to a passageway 22, connected with an outlet 23 from the valve body.

The body part 12 is likewise shown as having a passageway 24 leading through the end thereof in communication with the mixing chamber 16, and as having a wall portion 25 having a central passageway 26 leading thereinto from the end of said valve body and communicating with a discharge passageway 28 in axial alignment with the bypass passageway 22 for discharging mixed hot and cold water through the outlet 23.

The outer ends of the valve body parts 11 and 12 are shown as being closed by fluid operated diaphragm valves 27 and 29 respectively, maintained in position in the valve body by caps 30 and 31 respectively. The cap 30 is shown as having a guide 32 extending outwardly therefrom, forming a guide for an armature 33 of the solenoid for controlling operation of the pressure operated diaphragm valve 27. A solenoid coil (not shown) encircles the guide 32 and when energized retracts the armature 33 against a spring 34 to effect opening of the valve as in Patent No. 2,620,134 which issued to Frank E. Obermaier on Dec. 2, 1952.

The cap 31 is likewise shown as having a guide 35 extending therefrom and having an armature 36 of a solenoid (not shown) for controlling operation of the pressure operated diaphragm valve 29.

The caps 30 and 31 are shown as being recessed at their rims within the outer faces of the body parts 11 and 12 for retaining the diaphragm operated valves 27 and 29 to the ends of the respective body parts in leak proof relation with respect thereto, and as being maintained in position on the ends of said body parts by yokes 37 and 39 having engagement with said caps. Through bolts (not shown) connect the yokes 37 and 39 together and maintain the caps 30 and 31 and diaphragm valves 27 and 29 to the ends of the valve body parts and also secure the valve body parts together, as is shown and described in the aforementioned Patent No. 2,620,134, and no part of my present invention so not herein shown or described further.

The diaphragm valves 27 and 29 are each of a similar construction and are similar to those shown in the aforementioned Obermaier patent, so need only herein be shown and described in sufficient detail to make my present invention readily understandable.

The diaphragm valve 27 is shown as having a central passageway 39 leading therethrough and engaged by a conical end 40 of the armature 33 to effect a balance of the pressure on opposite sides of the diaphragm 27 and maintain the valve closed. The diaphragm 27 likewise has a bleeder pasesageway 41 leading therethrough, to allow fluid to pass onto both sides of the diaphragm and maintain the valve closed when the conical end 40 of the plunger 33 closes the passageway 39. Upon release of the conical end 40 from the passageway 39, as by energization of the magnet coil (not shown) of the solenoid, controlling operation of the valve 27, the pressure on the outer side of the diaphragm will be released through the central passageway 39. The pressure on the underside of the diaphragm will then be greater than that on the outerside and will cause the diaphragm to flex upwardly and unseat the valve, and allow the water to flow through the central passageway 20 and the bypass passageways 21 and 22 out of the outlet 23.

It may therefore be seen that upon energization of the solenoid 33 that the valve 27 will open to pass hot water through the outlet 23. Upon energization of the solenoid 36, the valve 29 will open to pass mixed hot and cold water through the passageway 26 and the outlet 23.

With the valve as just described the hot and cold water are only correctly proportioned when the pressure of the hot and cold water entering the inlets 13 and 14 is the same. Where the cold water pressure may be greater, there will be a predominance of cold water in the mixed water passing through the outlet 23. The contrary is true where the pressure of the hot water may be greater than that of the cold water.

The valve of my invention remedies this difficulty without the use of the thermostatic element heretofore provided by insuring a constant proportioning of the hot and cold water in the mixing chamber 16, and thus controlling the temperature of the mixed water by the volumes of hot and cold water delivered to the mixing chamber. I, therefore, compensate for pressure variations in the hot and cold water pressure lines by a series of proportioning or flow control devices maintaining substantially constant delivery volumes of water into the mixing chamber 16 regardless of variations in pressure at the source.

As herein shown, a constant volume flow control device 44 is provided in the cold water inlet 14 and another constant volume flow control device 45 is provided in the chamber 15 on the upstream side of a check valve 46, defining the inner end of the mixing chamber 16, and arranged to prevent the passage of cold water into the chamber 15 and out the hot water outlet 17.

The proportioning of flow control device 44 is shown as comprising an annular seating member 47 seated against a shoulder 49 in the cold water inlet 14 and forming a seat for a deformable annular flow control member 50. The seating member 47 is shown as having a central opening 51 therethrough in the form of two frusto-conical surfaces, one of said surfaces being at a steeper angle than the other and forming the outlet orifice for the seating member 14. The other frusto-conical surface terminates into a shoulder or outer annular surface of the seating member and is abutted by the annular flow control member 50. Upon increases in pressure in cold water entering the valve body through the inlet 14, the water will tend to deform the annular flow control member 50 in the region of its central orifice into the frusto-conical passageway 51, restricting the cross-sectional area of the orifice of the valve, at the upstream side thereof. This adjusts the flow through the orifice 51 in accordance with variations in pressure, and assures a constant flow of hot water to the central mixing chamber 16 through the annular flow control member 50, as in United States Patent No. 2,454,929, which issued to Leslie A. Kempton on November 30, 1948.

It should here be understood that while I have shown a flow control member in the inlet in the form of an annular disk, that the flow control member need not be an annulus, but may be in the form of a disk contoured with flow proportioning characteristics therein, or may be a plain disk seating against a contoured seat, to effect the desired flow control, or may be various other forms of flow control devices well known to those skilled in the art.

On the downstream side of the seating member 47, is a check valve 55. The check valve 55 is arranged to prevent the backflow of mixed water into the cold water inlet and is herein shown as comprising a cage 56 of a cup-like form having a perforated bottom, certain of the perforations of which may receive aligned nibs 57, 57 extending from a flexible disk 59 on the inside of said cup, and shown as abutting the bottom thereof. The disk 59 may be formed from rubber, an elastomer or any other like material, and flexes in a downstream direction, to permit cold water to enter the mixing chamber 16, and tightly engages the bottom of the cage 56 upon back pressures within the cage, to block the backflow of water into the inlet 14.

The check valve 46 is like the check valve 55 and includes a cage 60 seated in the mixing chamber 16 and defining the inner end thereof, and having a flexible disk 61 on the inside thereof, to block the flow of cold water into the hot water chamber 15.

The flow control device 45 on the upstream side of the check valve 46, in the direction of flow of hot water into the mixing chamber 16, is shown as being like the flow control device 44. This flow control device includes a resilient annulus 63 like the resilient annulus 50 and seating against a seating member 64, having a central orifice 65 leading therethrough like the orifice 51 of the seating member 47, to accommodate the flow control annulus to flex inwardly upon increase in pressure thereon, and reduce the cross-sectional area of the orifice therethrough as the pressure on the flow control annulus increases. It should here be understood that the proportioning or flow control device 45 and seating member 64, like the flow control device 44 and seating member 47, may be of various forms to attain the required flow proportioning effect, and that I do not desire to be limited to the particular flow control device shown.

A flow control device 67 is likewise shown in the bypass passageway 22 for proportioning the flow of hot water through the outlet 23 when the valve 29 is closed. The flow control device 67 is like the flow control devices 44 and 45 and has a seat 68 retained in the passageway 22, as by a snap-ring 69. While the flow control device 67 is herein shown in the bypass passageway 22 for the hot water, it may or may not be used depending upon the use to which the valve may be put.

It may be seen from the foregoing, that I have provided an extremely simple form of mixing valve compensating for pressure variations of both the hot and cold water, and thus maintaining a constant proportioning of the hot and cold water and a uniform discharge of the mixed water through the outlet 23, at a substantially uniform temperature determined by the temperature of the hot and cold water at the source.

It may further be seen that the valves 27 and 29 may be alternately operable so that when the solenoid controlling operation of the valve 27 is energized hot water only will be discharged through the outlet 23 and that when the solenoid controlling operation of the valve 29 is energized, tempered water will be discharged through the same outlet.

It will be understood that various modifications and variations of the present invention may be effected without departing from the scope of the novel concepts thereof.

I claim as my invention:

1. In a mixing valve, a valve body having a mixing chamber therein, a cold water inlet into said body leading to said mixing chamber and having a flow control device therein for maintaining a substantially constant rate of flow therethrough under variations in pressure, a hot water inlet into said body, a fluid passageway in said body communicating with said hot water inlet and leading to said mixing chamber and having a flow control device therein for maintaining a substantially constant rate of flow therethrough under variations in pressure, a fluid passageway in said body communicating with said mixing chamber and opening to the outside of said body for association with a first diaphragm shut-off valve, a fluid passageway in said body communicating with said hot water inlet and opening to the outside of said body for association with a second diaphragm shut-off valve, first and second diaphragm shut-off valves respectively associated with said body for cooperation with said fluid passageways opening to the outside thereof, an outlet from said body, a fluid passageway in said body communicating with said outlet and opening to said first diaphragm valve, and a fluid passageway in said body communicating with said outlet and opening to said second diaphragm valve, the flow path through said body going to said cold water inlet and through said mixing chamber and out said outlet by way of said first diaphragm valve containing not more than a single flow control device for maintaining a substantially constant rate of flow under variations in pressure, the flow path through said body going into said hot water inlet and through said mixing chamber and out said outlet by way of said first diaphragm valve containing not more than a single flow control device for maintaining a substantially constant rate of flow under variations in pressure, and the flow path through said body going into said hot water inlet and out said outlet by way of said second diaphragm valve containing not more than a single flow control device for maintaining a substantially constant rate of flow under variations in pressure.

2. In a mixing valve, a valve body having a hollow interior portion opening to each end thereof, an outlet from said valve body intermediate the ends thereof, a cold water inlet into said valve body and the hollow interior portion thereof adjacent one end of said valve body, a hot water inlet into said valve body and the hollow interior portion thereof adjacent the opposite end of said valve body, a diaphragm shut-off valve associated with the end of said valve body adjacent said hot water inlet, a hot water fluid passageway leading from said diaphragm shut-off valve to said outlet, a resilient flow control device in said hot water passageway upstream of said outlet, a resilient flow control device in the hollow interior portion of said valve body intermediate the ends thereof and downstream of said hot water inlet, a passageway from the end of said valve body adjacent said cold water inlet leading to said outlet independently of said hot water passageway, a diaphragm shut-off valve associated with the end of said valve body adjacent said cold water inlet and controlling the flow of water from said cold water inlet and the hollow interior portion of said valve body through said last mentioned passageway to said outlet, a resilient flow control device in said cold water inlet, and individual check valves associated with and downstream of the flow control device in said valve body and the flow control device in said cold water inlet, said check valves with said diaphragm shut-off valve associated with the end of said valve body adjacent said cold water inlet defining a mixing chamber for hot and cold water and preventing the mixture of cold or tempered water with the water in said hot and cold water inlets.

References Cited in the file of this patent
UNITED STATES PATENTS

| | | |
|---|---|---|
| 941,596 | White | Nov. 30, 1909 |
| 1,989,248 | Scott | Jan. 29, 1935 |
| 2,454,929 | Kempton | Nov. 30, 1948 |
| 2,575,043 | Branson | Nov. 13, 1951 |
| 2,620,134 | Obermair | Dec. 2, 1952 |
| 2,708,092 | Smith | May 10, 1955 |